United States Patent [19] [11] 4,380,615
Sauerbrunn [45] Apr. 19, 1983

[54] DIAMINE RECOVERY PROCESS

[75] Inventor: Robert D. Sauerbrunn, Seaford, Del.

[73] Assignee: E. I. Du Pont de Nemours and Company, Wilmington, Del.

[21] Appl. No.: 240,914

[22] Filed: Mar. 5, 1981

[51] Int. Cl.$^3$ ............................................. C08G 69/26
[52] U.S. Cl. ........................................ 526/65; 526/68; 526/70; 526/71; 528/335
[58] Field of Search ......................... 526/68, 65, 70, 71; 528/335

[56] References Cited

U.S. PATENT DOCUMENTS

| | | | |
|---|---|---|---|
| 2,163,584 | 6/1939 | Carothers et al. | 260/78 |
| 3,185,672 | 5/1965 | Clemo et al. | 260/78 |
| 3,296,217 | 1/1967 | Tate | 260/78 |
| 3,402,152 | 9/1968 | Brignac et al. | 260/78 |
| 3,900,450 | 8/1975 | Jaswal et al. | 260/78 |
| 3,937,686 | 2/1976 | Augstkalns | 525/68 |
| 3,960,820 | 6/1976 | Pinney | 260/78 R |

FOREIGN PATENT DOCUMENTS 854223  11/1960  United Kingdom .

Primary Examiner—Harold D. Anderson

[57] ABSTRACT

The efficiency of a rectifying zone for the recovery of diamine vapor from water vapor being separated from a reaction zone in which a polyamide-forming salt is being heated to form a prepolymer is improved by adding a dicarboxylic acid to the reflux water at the top of the rectifying zone.

8 Claims, 2 Drawing Figures

DIAMINE RECOVERY PROCESS

DESCRIPTION

TECHNICAL FIELD

This invention involves an improved process for recovering unreacted diamine from water vapor being evolved from a reaction zone in which a polyamide-forming salt prepared from a diamine and a dicarboxylic acid is being heated to remove water and to cause the salt to undergo a partial condensation polymerization reaction to form a polyamide. More specifically, it involves a process for improving the effectiveness of a rectifying zone which recovers diamine from water vapor being separated from such a reaction zone.

BACKGROUND ART

U.S. Pat. No. 3,296,217, U.S. Pat. No. 3,900,450 and British Patent Specification No. 854,223 disclose various processes for the preparation of a fiber-forming polycarbonamide from an aqueous solution of a salt derived from substantially chemically equivalent proportions of an aliphatic diamine and a dicarboxylic acid. In these processes aqueous vapors evolving from a heated reaction zone into which the salt is fed are fractionated in a rectifying zone so that unreacted diamine contained in those vapors is removed therefrom and returned to the reaction zone along with liquid reflux water.

The effectiveness of such rectifying zones in recovering unreacted diamine depends, among other things, upon the operating reflux ratio, i.e., the ratio by weight of liquid reflux water to water vapor flowing through the zone. Generally as the reflux ratio is raised, more liquid water is returned to the reaction zone and more diamine is recovered, thus reducing ingredient costs. Such recovery also reduces environmental pollution problems occasioned by release of diamine to the atmosphere. Unfortunately, higher reflux ratios require more energy to operate than lower ones, since the liquid reflux water being returned to the reaction zone must be re-boiled. Consequently, recent increases in energy costs have made some recovery processes, which previously were economical to operate, no longer economical to do so. In other words, the cost of process energy can no longer be offset by savings resulting from recovered ingredients. Thus, more expensive energy has created an incentive to reduce the reflux ratio in some recovery processes as described above at a potential sacrifice in environmental quality where the value of the diamine recovered no longer offsets the cost of the process energy required to recover it.

Figure 1:
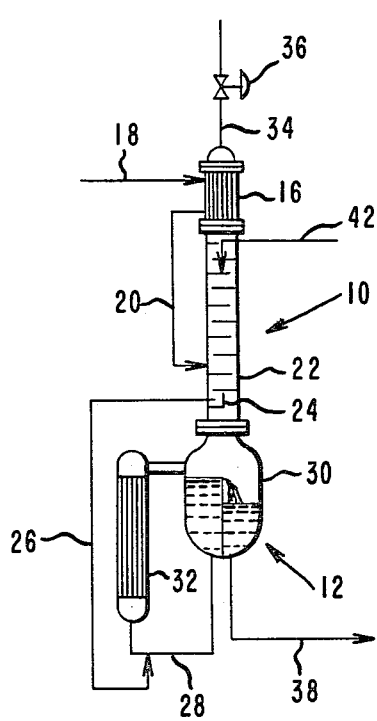
FIG. 1 is a schematic representation of an apparatus suitable for use in carrying out one embodiment of a process of the present invention.

In reference to FIG. 1, an apparatus for performing a polymerization continuously includes a rectifying zone 10, and an initial reaction zone 12 in which an aqueous solution of a polyamide-forming salt, for example hexamethylene diammonium adipate, is uniformly mixed, partially vaporized and partially reacted under predetermined pressure and temperature to form water vapor and a prepolymer which are separately removed from the reaction zone. Water vapor from the initial reaction zone is vented through the rectifying zone 10 and the partially reacted salt, or prepolymer as defined below, is removed through exit line 38 to subsequent reaction zones (not shown) for further polymerization.

DISCLOSURE OF THE INVENTION

An object of this invention is a process for reducing energy costs associated with the recovery by rectification of unreacted diamines from water vapor in the preparation of polyamides. Another object is a process for improving the efficiency of such diamine recovery at lower reflux ratios. Accomplishment of these and other objects will be apparent from the remainder of this disclosure.

This invention provides an improved process for recovering unreacted diamine vapor from water vapor being separated from a reaction zone in which an aqueous solution of a polyamide-forming salt prepared from at least one diamine and at least one dicarboxylic acid is being heated and partially reacted to form water vapor and a polyamide prepolymer, said process being of the type in which a portion of the vapors is continuously being separated from said reaction zone through a rectifying zone having an upper portion and a lower portion in which rectifying zone the water vapor is partially condensed as reflux water containing unreacted diamine which diamine is recovered by returning the reflux water from said lower portion to the reaction zone, wherein the improvement comprises continuously adding a predetermined amount of said dicarboxylic acid or acids to the reflux water in an upper portion of said rectifying zone to form a water-soluble polyamide-forming salt with unreacted diamine contained therein.

The greatest reductions in diamine loss can be realized by this invention if the acid is added in an amount at least chemically equivalent to the amount of unreacted diamine present in that portion of the reflux water to which the acid is added, e.g., the water in one bubble cap tray. The acid is most conveniently added as an aqueous solution thereof. At least in some cases the concentration of acid in the added solution can be increased, thus reducing the amount of extra water being added to the system, by using as a solvent an aqueous solution of the same polyamide-forming salt being used in the polymerization since the acid can be more soluble in the aqueous salt solution, e.g., a 25% salt solution, than it is in pure water.

In reference now to FIG. 1 in greater detail, a combination partial condenser-preheater 16 is shown in the top portion of rectifying zone 10. Partial condenser-preheater 16 has a salt inlet line 18 and a salt exit line 20 which connects to the mid-portion of rectification column 22 having a number of bubble cap trays. A collection pan 24 is positioned below the lowest of the bubble cap trays. A liquid line 26 feeds from collection pan 24 to a recirculating loop 28 which connects the bottom of separator 30, which comprises the base-section of rectification column 22, to the bottom of vertical thermosyphon reboiler 32. A vent line 34 with a control valve 36 is provided in the top of rectifying zone 10. Acid inlet line 42 feeds from a source (not shown) into the top tray of column 22. Exit line 38 connects the bottom of separator 30 through appropriate means (not shown) to subsequent polymerization reaction zones as known in the art.

Figure 2:
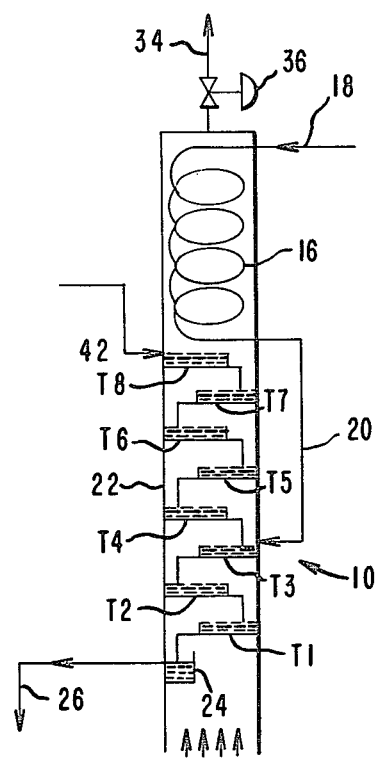
FIG. 2 is a schematic representation in greater detail of a rectifying zone suitable for use in the apparatus of FIG. 1.

As shown in greater detail in FIG. 2, rectification column 22 has eight bubble cap trays, numbered from the bottom tray as T1 through top tray T8. Collection pan 24 is positioned below tray T1. Acid inlet line 42 feeds into top tray T8.

As an alternative, partial condenser 16 can be above and separate from the top of column 22. Then reflux water can be fed from it to the top column tray by a pipe into which the acid is added to mix with the water before it enters the top tray.

When the apparatus is operated as according to the prior art, a predetermined flow of a polyamide-forming aqueous salt solution, preferably a 40 to 60% by weight solution in water, of a salt of an aliphatic diamine and a dicarboxylic acid such as hexamethylene diammonium adipate, is fed to the partial condenser-preheater 16 through salt inlet line 18. The temperature of the solution entering the partial condenser-preheater 16 is in the range of 25° to 50° C. and the solution is heated therein to a temperature which approaches the temperature of the vapor in the upper portion of rectifying zone 10. This vapor temperature is approximately equal to the boiling point of water at the pressure being maintained in the rectifying zone 10, preferably in the range of from about 160 to about 350 lb./square inch absolute (11.2 to 24.6 kg.cm$^2$). The partial condenser-preheater 16 condenses a portion of the vapor in contact with it in the top portion of rectifying zone 10 to provide liquid reflux water for the rectification. From the partial condenser-preheater 16, the salt solution is fed through line 20 to a mid-portion of rectification column 22. As shown in FIG. 2, the preheated salt solution is fed onto tray T3, the third tray from the bottom. Of course, the number of trays may be more or less than the eight shown and line 20 may enter the column at any tray above the bottom tray and below the top tray. Sieve plate trays or column packing may be used in place of the bubble cap trays in the rectification column.

Upon entering the rectification column 22, the salt solution mixes with liquid reflux water and passes down the column from tray to tray and collects in collection pan 24 from which it flows through liquid line 26 and is injected or sparged into the recirculating loop 28 directly beneath reboiler 32. The mixed salt solution and reflux water mixes with the reaction liquid circulating in recirculating loop 28 and passes into the bottom of reboiler 32 where it is heated, partially vaporized and partially reacted to form vapor and prepolymer which flow from the top of the reboiler 32 into the separator 30. Vapors rise from separator 30 through rectification column 22 where the rising vapor is contacted with reflux water and salt solution to extract unreacted diamine from the rising vapor. Vapor rising from the top tray T8 contacts partial condenser-preheater 16 and is partially condensed to produce the reflux water. The amount of condensed water returned as reflux to rectification column 22 from partial condenser-preheater 16 is governed in part by the volume and temperature of the salt solution being fed through salt inlet line 18.

Under present economic conditions the extra amount of diamine saved by operating at a high reflux ratio may not compensate for the extra energy required to operate at the high ratio. The present invention can solve this dilemma by reducing diamine loss through the controlled addition of a dicarboxylic acid to reflux water in an upper portion of the rectification column. For example, the addition may occur in the bubble cap region of the top tray of the column or in a downcomer section from the top tray to the next tray. Any substantial acid addition to the reflux water will reduce diamine loss, but for more effective results the acid is added in an amount at least sufficient theoretically to react with all of the diamine present in the reflux water at the point of addition. Because of the rectifying process, the concentration of diamine present in the reflux water at a given level in the column decreases towards the top of the column. Therefore the higher the point in the column at which addition occurs, the less the acid needed to react with the diamine there. Most effective diamine recovery is assured if an excess of acid is added, e.g., to lower the reflux water pH to within the range of 7.0 to 4.5.

This invention does not interfere with the ability to control the carboxyl and amine end concentration in the final polymer product. The acid, when properly added, does not cause an imbalance in the process since the extra recovered diamine reacts with the added acid to maintain the proper chemical balance. For example, to determine the amount of acid to be added one need only determine by conventional analytical means the amine concentration in water at the point of addition and the rate of flow. One can then readily calculate the amount of acid needed to accomplish the desired result.

The chemistry of aqueous solutions containing a diamine and a dicarboxylic acid relative to the preparation of polyamides, and measurements of pH of such solutions, are well known in the art as described for example in U.S. Pat. No. 2,163,584. The pH value at the point of equivalency can differ somewhat for different salts but, for those preferred salts of this invention, will usually be between 6.6 and 7.8. It can also vary somewhat with the concentration of the solution. For example, the pH of the neutralized salt of hexamethylene diamine and adipic acid in a 0.4 mol solution (according to the patent) is 7.62.

The present invention is particularly effective when used with a continuous process for the preparation of polyamides of the type described and claimed in U.S. Pat. No. 3,900,450 and most particularly with the partial condenser-preheater in the top of the rectifying zone. The Figures and entire specification of U.S. Pat. No. 3,900,450 are incorporated herein by way of reference. In such a process heat for a separate auxiliary preheater can be obtained from waste energy, for example from off gases from a later stage of the polymerization process.

The term "prepolymer" as used herein refers to the partially reacted polyamide-forming salt solution produced in the initial reaction zone. This invention is particularly advantageous for recovering diamine from an initial reaction zone which provides an extent of reaction in the range of from 70 to 98%, which generally corresponds to a polymer relative viscosity in the range of about 2.3 to 11 for a nylon polymer such as poly(hexamethylene adipamide). The extent of reaction is the fraction, expressed as a percentage, of the reactive functional groups on the original reactants which have reacted to form amide groups.

EXAMPLE

This example compares diamine losses from a continuous polymerization process while it is being operated with and without the present invention. In both instances, poly(hexamethylene adipamide), 6—6 nylon, for use in spinning into filaments and having a relative viscosity of about 42 and containing about 44 amine end groups and about 88 carboxyl end groups per $10^6$ grams of polymer is prepared using an apparatus having an initial reaction zone of the type shown in FIGS. 1 and 2 herein. The prepolymer, having a 90% degree of reaction, as provided by the initial reaction zone is further polymerized in a conventional manner using 2 subsequent reaction stages consisting of a flasher stage and a vertical conical finisher as known in the art. The rectification column 22 connected to the initial reaction zone 12 contains twelve bubble cap trays.

A. Process Not of the Present Invention (Control)

A 51% by weight aqueous salt solution of hexamethylene diammonium adipate with a pH of 7.5 is fed to salt inlet line 18 at a rate of 5682 lb./hr., hereinafter abbreviated as pph, (2577 kg./hr.) from a holding tank maintained at 40° C. To provide the above specified polymer end-group composition a solution containing (by weight) 18% adipic acid, 25% hexamethylene diammonium adipate salt and the remainder water is added to the main salt solution at a rate of 20 pph (9.1 kg./hr.). The combined solutions are heated to 50° C. in a separate preheater before passing through salt inlet line 18 into the partial condenser-preheater 16 in which the solution temperature is boosted up to 200° C. This heated salt solution is then fed through salt exit line 20 onto the third tray from the bottom of rectification column 22 where it mixes with reflux water flowing down the column. The combined salt solution and reflux water are collected in collection pan 24 and passed by gravity through liquid line 26 into recirculating loop 28 at a rate of about 7172 pph (3253 kg./hr.) at 200° C. and a salt concentration of about 40%. The temperature in separator 30 is maintained at 230° C. and the pressure in rectifying zone 10 and initial reaction zone 12 is maintained at 225 lb./in² absolute (15.8 kg./cm²) by control valve 36 on vent line 34. The pH of the preheated salt solution entering the third tray is in the range of about 7.3–7.4. Vapors from separator 30 flow upwardly through rectification column 22 at a rate of 4385 pph (1989 kg./hr.) for steam and 43 pph (19.5 kg./hr.) for unreacted hexamethylene diamine vapor. Of this 1470 pph (666.8 kg./hr.) is condensed as reflux water giving a reflux ratio of about 0.33. Steam is emitted from vent line 34 at a rate of 2915 pph (1322 kg./hr.) along with about 3 pph (1.4 kg./hr.) of hexamethylene diamine vapor. Under these conditions of diamine loss the pH of the reflux water in the region of the top two trays in column 22 is in the range of about 10 to 11. The column recovers about 93% of the diamine vapor entering the column from the separator.

B. Process Using the Present Invention

The process of A above is repeated but with a salt feed in line 18 of 5659 pph (2567 Kg./hr.) and instead of adding any adipic acid/salt solution to the main salt stream prior to its being fed by salt inlet line into partial condenser-preheater 16, an acid/salt solution of the same composition (18% acid, 25% salt) is added by means of acid inlet line 42 to the top tray, twelfth tray, of rectification column 22 where it mixes with the reflux water flowing from the partial condenser-preheater 16. The incoming salt solution in line 18 is separately preheated to 150° C. prior to entering preheater 16 (instead of 50° C.), using as the source of heat effluent steam from a later stage in the polymerization process.

Half of the acid/salt solution added in this way, aside from acidifying the water in top of the column, compensates for the amount of the solution which had been added in A prior to the preheater, i.e., 20 pph (9.1 kg./hr.). The other half provides additional acidity to neutralize unreacted diamine present in the reflux water plus a slight excess to maintain the desired chemical composition of end groups in the final polymer, which in this case for dyeability purposes contains more carboxyl end groups than amine end groups. The acid reacts with the unreacted diamine to form the water-soluble salt, hexamethylene diammonium adipate, which is substantially nonvolatile and thus retains the diamine in the system. The temperature and pressure in separator 30 remain the same as in A. The acid/salt solution has a pH of 4.9 which is sufficient to provide a pH of less than 7.0 and about 4.9 in the reflux water.

The 150° C. temperature of the salt solution entering partial condenser-preheater 16 results in less reflux water being returned to rectification column 22 than before and amounts to 490 pph (222 kg./hr.), which reduces the heat load on the reboiler. Steam from separator 30 passes through rectification column 22 at the rate of 3417 pph (1550 kg./hr.) which gives a reflux ratio of about 0.14. Steam entering the base of column 22 contains 34 pph (15.4 kg./hr.) of unreacted hexamethylene diamine. Steam is vented from rectification column 22 through vent line 34 at the rate of 2927 pph (1328 kg./hr.). The vented steam contains substantially no unreacted diamine, that is less than 0.0 pph (0.0 kg./hr.).

The chemical balance of the prepolymer leaving the separator 30 is substantially the same as in A, as shown by substantially no change in the polymer composition being produced for spinning of filaments in the final stage of this continuous polymerization process.

In a process operating under very similar conditions with a salt feed concentration of 65% and a reflux ratio of 27% the column efficiency in diamine recovery is boosted from about 85% to about 97–98% by a similar addition of adipic acid to the top tray in the column.

What I claim is:

1. An improved process for recovering unreacted diamine vapor in the form of a diamine dicarboxylic acid salt from water vapor continuously being separated from a reaction zone in which an aqueous solution of a polyamide-forming salt prepared from at least one diamine and at least one dicarboxylic acid is being heated and partially reacted to form water vapor containing a vapor of said diamine and a polyamide prepolymer, said process consisting essentially of one in which a portion of the water vapor is continuously separated from the reaction zone through a rectifying zone having an upper portion and a lower portion and in which rectifying zone the water vapor is partially condensed as reflux water containing unreacted diamine which diamine is recovered by returning the reflux water from said lower portion to the reaction zone, wherein the improvement comprises continuously adding a pre-determined amount of said dicarboxylic acid or acids to the reflux water in an upper portion of said rectifying zone to form a water-soluble polyamide-forming salt with unreacted diamine contained therein.

2. A process of claim 1 wherein the adding of said acid is an amount and at a rate which is at least chemically equivalent to the amount of diamine which is present in the reflux water to which the acid is added.

3. A process of claim 2 wherein the acid added provides said reflux water with a pH within the range of 4.5 to 7.0.

4. A process of claim 1, 2 or 3 wherein the acid is added in the form of a solution consisting essentially of the free acid or acids dissolved in a solution of said polyamide-forming salt in water.

5. A process of claim 2 in which the rectifying zone is comprised of at least eight vertically arranged bubble cap trays and the acid is added to a tray no more than three trays below the top tray.

6. A process of claim 5 wherein the acid is added to the top tray.

7. A process of claim 2 wherein the polyamide-forming salt is prepared from hexamethylene diamine and adipic acid and the acid added to the reflux water is adipic acid.

8. A process of claim 2 wherein said prepolymer is subsequently polymerized to a fiber-forming molecular weight.

* * * * *